US008145246B2

(12) United States Patent
Rasmussen

(10) Patent No.: US 8,145,246 B2
(45) Date of Patent: Mar. 27, 2012

(54) LOW LATENCY, HIGH QUALITY LINK FOR AUDIO TRANSMISSION

(75) Inventor: Crilles Bak Rasmussen, Smørum (DK)

(73) Assignee: Oticon A/S, Smorum (DK)

( * ) Notice: Subject to any disclaimer, the term of this patent is extended or adjusted under 35 U.S.C. 154(b) by 357 days.

(21) Appl. No.: 12/475,189

(22) Filed: May 29, 2009

(65) Prior Publication Data

US 2009/0298431 A1 Dec. 3, 2009

(30) Foreign Application Priority Data

May 30, 2008 (EP) .................................... 08104175

(51) Int. Cl.
*H04B 7/00* (2006.01)
*H04B 15/00* (2006.01)

(52) U.S. Cl. ........................................... 455/502; 455/7

(58) Field of Classification Search ................. 455/41.1, 455/41.2, 41.3, 502, 569.1, 575.2
See application file for complete search history.

(56) References Cited

U.S. PATENT DOCUMENTS

| | | | | |
|---|---|---|---|---|
| 5,623,483 | A | 4/1997 | Agrawal et al. | |
| 6,005,872 | A | 12/1999 | Bassi et al. | |
| 7,218,900 | B2 * | 5/2007 | Suzuki | 455/180.1 |
| 2003/0045283 | A1 | 3/2003 | Hagedoorn | |
| 2005/0110700 | A1 | 5/2005 | Terry | |
| 2007/0086601 | A1 * | 4/2007 | Mitchler | 381/79 |
| 2007/0098195 | A1 | 5/2007 | Holmes | |
| 2007/0291723 | A1 | 12/2007 | Chou et al. | |
| 2008/0013763 | A1 | 1/2008 | Lotter et al. | |

FOREIGN PATENT DOCUMENTS

| | | | |
|---|---|---|---|
| DE | 20 2007 000 644 | U1 | 5/2007 |
| EP | 1 107 472 | A2 | 6/2001 |
| EP | 1 460 769 | A1 | 9/2004 |
| FR | 2 803 466 | A | 7/2001 |
| WO | WO-2005/053179 | A1 | 6/2005 |
| WO | WO-2005/055654 | A1 | 6/2005 |
| WO | WO-2006/117365 | A1 | 11/2006 |

OTHER PUBLICATIONS

Zolfaghari et al., "A Low-Power 2.4-GHz Transmitter/Receiver CMOS IC," *IEEE Journal of Solid-State Circuits*, vol. 38, No. 2, Feb. 2003, pp. 176-183.

* cited by examiner

*Primary Examiner* — Ping Hsieh
(74) *Attorney, Agent, or Firm* — Birch, Stewart, Kolash & Birch, LLP

(57) ABSTRACT

A system includes a transmitting device, an intermediate communications device, and a receiving device. The system establishes a first synchronous wireless link between a transmitting device and the intermediate device, and a second synchronous wireless link between the intermediate device and the receiving device. The transmitting device may include a wireless audio transmitter, a sampling unit configured to convert an incoming audio signal to a stream of digitized audio samples, an encoder unit configured to code the stream of digitized audio samples according to an audio codec based on a sample oriented audio compression algorithm to provide a stream of coded digitized audio samples, and a signal transmitting unit transmitting the stream of coded digitized audio samples over the first synchronous wireless link to the intermediate device. The intermediate device transmits the stream of coded digitized audio samples to the receiving device through the second synchronous wireless link.

20 Claims, 2 Drawing Sheets

LOW LATENCY, HIGH QUALITY LINK FOR AUDIO TRANSMISSION

TECHNICAL FIELD

The invention relates to the transmission of audio data to be perceived together with and related to live or recorded images, e.g. from a television. The invention relates specifically to a method of transmitting audio data between a transmitter and a receiver and to a listening system.

The invention may e.g. be useful in applications involving wireless audio transmission to a listening device, e.g. a hearing instrument.

BACKGROUND ART

The following account of the prior art relates to one of the areas of application of the present invention, audio transmission to a hearing aid.

Previously audio transmissions over Bluetooth have been focused on, either low latency, low quality, voice transmission for phone calls, or high latency high quality transmission for entertainment. These solutions are known from the Bluetooth profiles 'Headset' and 'Hands-Free', respectively, which both are designed for phone use, and the A2DP profile (A2DP=Advanced Audio Distribution Profile), which is designed for music.

Recently the rise of 3 G telephony has driven the development of higher quality, low latency transmission within the Bluetooth SIG (SIG=Special Interest Group). This has resulted in the drafted Wideband speech profile, which is based on the frame based SBC codec (SBC=Low Complexity Subband Codec, an audio codec providing compression with inherent loss of data) known from the A2DP profile of the Bluetooth standard transmitted over the low latency SCO connection (SCO=Synchronous Connection-Oriented), which again is known from the Hands-Free profile of the Bluetooth standard.

US 2008/0013763 A1 describes a system for wireless audio transmission with a low delay from a transmission device (e.g. a TV-set) to a hearing device. The audio data are transmitted in a Bluetooth signal, and the transmission device comprises a hearing-aid-specific coder for compressing the audio data before its transmission. The system further comprises a relay station for converting the Bluetooth signal from the transmission device into a signal for inductive transmission to the hearing device. In the relay station, no recoding is performed during the conversion. The transmission device transmits in accordance with the Bluetooth A2DP protocol. The hearing-aid-specific coder has a lower sampling rate than the standard Bluetooth coder SBC.

US 2008/0013763 A1 is limited to the Bluetooth A2DP profile and focused on eliminating the delay caused by the trans-coding required to transfer audio between the two wireless links. A2DP requires the support of both 44.1 kHz and 48 kHz sampling rates in stereo, which can both be difficult to fit into a near field (inductive) link with relatively low bandwidth.

US 2007/0086601 A1 describes a flexible air interface protocol for a hearing aid system, the protocol including a frame synchronization word to delineate the start of a frame structure.

US 2007/291723 A1 deals with aligning PCM audio data with RF time slots of a WLAN interface (e.g. Bluetooth).

DISCLOSURE OF INVENTION

An object of the present invention is to provide a scheme for creating a low latency audio transmission link.

Objects of the invention are achieved by the invention described in the accompanying claims and as described in the following.

A Method of Transmitting Audio Data:

An object of the invention is achieved by a method of transmitting audio data between a transmitter and a receiver, comprising In the Transmitter:

a) sampling an incoming audio signal to provide a stream of digitized audio samples;

b) coding the stream of audio samples according to an audio codec providing a stream of coded samples;

c) transmitting the stream of coded samples over a synchronous wireless transmission link;

In the Receiver:

d) receiving the stream of coded samples;

e) decoding the stream of coded samples according to said audio codec to a stream of digitized audio samples.

Advantages of the present invention include a minimization of transmission delay while maintaining a relatively high audio quality. This is achieved by applying a synchronous connection (e.g. SCO) and a sample oriented audio compression algorithm. Typically, data in SCO are arranged in relatively short packets, typically 30 bytes long.

A2DP, on the other hand, (which is typically used to obtain high audio quality, cf. e.g. US 2008/0013763 A1 referred to above), works on an ACL (Asynchronous connection less) link and a frame oriented compression algorithm. The use of ACL requires buffering of the audio data, and the use of frame based compression requires the reception of an entire frame, both adding to the system delay. In the present context, the term 'frame based' as opposed to 'sample based' is intended to indicate that a frame based coding scheme (e.g. A2DP or MP3) needs a minimum number of samples (>one, typically tens or hundreds of samples) to operate on (thereby at least incurring a delay corresponding to the extension in time of the number of samples), whereas a sample based coding scheme operates on one sample at a time (e.g. G.722 or CVSD; CVSD (Continuously Variable Slope Delta) is a voice coding modulation scheme based on delta modulation with variable step size and e.g. used in some Bluetooth profiles).

The buffering and framing requirements are advantageously dispensed with in the solution according to the present invention.

The invention is targeted at real time applications where the transmitted data need to be synchronized to multiple duplicate electrical and acoustical sound fields.

The wireless transmission links dealt with in the present application are in general bi-directional (when not specifically defined as being uni-directional), i.e. a system implementing the method typically comprises a transmitter and a receiver (i.e. a transceiver). This is e.g. the case when the link protocol referred to is Bluetooth. In general an audio signal is transmitted in one direction only, while only control signals (e.g. for negotiating a transmission channel/frequency) are transmitted in the opposite direction. In other words the necessary bandwidth is much larger in one of the directions than in the other. In an embodiment, the wireless transmission link is disabled in one direction (the back link). However, in an embodiment, an audio signal is transmitted bi-directionally, e.g. in case one device is a headset and another device is a mobile telephone or an audio selection device.

In an embodiment, the audio data are modulated using CVSD modulation.

In a particular embodiment, the audio codec is the G.722 codec.

Embodiments of the invention work by encoding the audio stream using a G.722 codec and transmitting the data using a synchronous data link. The G.722 codec (an ITU-T standardized audio codec operating at 48-64 kbit/s and providing 7 kHz wideband audio; ITU=International Telecommunication Union is a specialized agency of the United Nations; ITU-T is the Telecommunication Standardization Sector of the ITU) has several advantages in comparison with SBC, when requiring the lowest possible latency. Most importantly it is sample based rather than frame based, reducing the algorithmic delay, and it is far more resistant to bit errors, which is important in applications where retransmission is impossible due to strict timing requirements.

The major drawback when using G.722 in comparison to a frame based compression algorithm is that the compression ratio is smaller, requiring either reduction of dynamic range or bandwidth. This is, however, no problem when considering hearing aids where the bandwidth is limited in comparison with consumer electronics.

In a particular embodiment, the synchronous wireless transmission link is a low latency link. In the present context, the term 'low latency' is taken to mean that the delay between 1) the audio signal transmitted via the wireless transmission link and received at the receiver located at a user and 2) corresponding visual images received by the user (e.g. of a TV-set showing pictures with timing cues (e.g. lip movements) related to the audio signal) is short enough not to be disturbing by the user receiving the images and the corresponding wirelessly transmitted audio signal (possibly in addition to the acoustically propagated version of the audio signal). Preferably the delay is smaller than 20 ms, such as smaller than 10 ms. Preferably the delay between the wirelessly propagated audio signal and the acoustically propagated version of the audio signal, when received by a user is smaller than 30 ms, such as smaller than 20 ms, such as smaller than 10 ms, such as smaller than 5 ms.

In a particular embodiment, the low latency link is a transparent link. The term transparent is in the present context taken to mean that the link protocol does not alter the transmitted bit stream (e.g. by coding it). This has the advantage that e.g. coding can be freely chosen and adapted to the application in question (e.g. to provide low latency), e.g. an audio codec not generically supported by the link protocol (e.g. Bluetooth).

In a particular embodiment, the synchronous wireless transmission link comprises an SCO connection of the Bluetooth standard. This has the advantage that data are subject to a very strict timing, which allows the processing of the audio data without any buffering. If instead relying on an ACL link, buffering would be required on the receiving side in order to ensure an uninterrupted audio stream.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 40 kHz (adapted to the particular needs of the application) to provide digital samples $x_n$ at discrete points in time $t_n$, each audio sample representing the value of the acoustic signal at $t_n$ by a predefined number $N_s$ of bits, $N_s$ being e.g. in the range from 1 to 16 bits.

In a particular embodiment, the sampling rate is larger than 8 kHz, such as larger than 12 kHz, e.g. 16 kHz or larger than 16 kHz.

In a particular embodiment, each audio sample comprises more than 2 bits, e.g. 4 bits or more than 4 bits. The more bits per sample, the higher audio quality (higher dynamic range).

In a particular embodiment, the transmission rate of the synchronous wireless transmission link is in the range from 32 kbit/s to 128 kbit/s, e.g. 64 kbit/s or higher than 128 kbit/s.

In a particular embodiment, the transmitter form part of an A/V device (A/V=audio/visual), e.g. a TV-set (or a set-top box) or a wireless microphone.

In a particular embodiment, the receiver form part of a listening system. In an embodiment, the listening system comprises an intermediate communications device, e.g. an audio selection device for selecting an audio signal among a number of audio signals and for transmitting the selected audio signal to one or more listening devices, e.g. one or more hearing instruments. In a particular embodiment, the receiver form part of the intermediate communications device. In an embodiment, the intermediate communications device comprises a mobile telephone or an audio delivery device (e.g. a music player) or a combination thereof.

In a particular embodiment, the transmission between an A/V device, e.g. a TV-set or a wireless microphone comprising the transmitter and an intermediate communications device comprising the receiver is governed by the method according to the invention (e.g. G.722 coded audio data via a bi-directional Bluetooth, SCO link based on radiated fields), whereas the transmission from the intermediate communications device to one or more listening devices is governed by another method (e.g. G.722 coded audio data via another proprietary or standardized link protocol based on inductive communication). In an embodiment, the link between the intermediate communications device and the one or more listening devices is uni-directional (thereby saving power in the listening device). Alternatively, it may be bi-directional. In a particular embodiment, the characteristics of the transmission from the device comprising the transmitter to the intermediate communications device comprising the receiver are adapted to the characteristics of the link between the intermediate communications device and the one or more listening devices with a view to minimizing delay. In an embodiment, the characteristics of the transmission from the device comprising the transmitter comprise, type of coding, sample rate, link bandwidth, etc. Thereby the transmitted signal from an A/V device, e.g. a TV-set, or wireless microphone comprising the transmitter and received in the intermediate communications device can be relayed to the one or more listening devices without resynchronization, decoding/encoding and/or sample rate conversion, whereby delay in the total transmission of the audio signal from e.g. a TV-set to a hearing instrument can be reduced. In an embodiment the wireless link between the communications device and the hearing instrument(s) is a wireless link according to the present invention, e.g. based on Bluetooth, SCO. In an embodiment the wireless link between the communications device and the hearing instrument(s) is based on radiated fields using a standard or a proprietary communications protocol. In a particular embodiment, the decoding/encoding scheme (e.g. G.722 or CSV) and the sampling rate (e.g. $f_s$=20 kHz or $f_s$=32 kHz) used in the link between the transmitter and the receiver of an intermediate device is the same as in the link between the intermediate device and the listening device.

In an embodiment, the listening system comprises one or more listening devices, e.g. one or more battery driven listening devices, e.g. a hearing instrument, e.g. a pair of hearing instruments. In a particular embodiment, the receiver form part of the one or more listening devices.

In a particular embodiment, the same decoded digitized audio signal is used in more than one listening device, e.g. in both hearing instruments of a binaural hearing aid system.

In a particular embodiment, the wireless transmission link is based on radiated electromagnetic fields. In a particular embodiment, the wireless transmission link is based on inductive communication (near-field).

A Listening System:

The features of the method described above, in the detailed description below and in the claims are intended to be combined (where appropriate) with the system described below (and vice versa).

A listening system is furthermore provided by the present invention. The listening system comprises a wireless transmitter and a corresponding receiver, the system comprising In the Transmitter:

a) a sampling unit adapted for converting an incoming audio signal to a stream of digitized audio samples;

b) an encoder unit adapted for coding the stream of audio samples according to an audio codec to provide a stream of coded audio samples;

c) a signal transmitting unit adapted for transmitting the stream of coded audio samples over a synchronous wireless transmission link to the receiver;

In the Receiver:

d) a signal receiving unit adapted for receiving the stream of coded audio samples from the transmitter;

e) a decoder unit adapted for decoding the stream of coded audio samples according to said audio codec to a stream of digitized audio samples. The listening system has the same as advantages as the method described above.

The transmitter and receiver form part of each their physically separate device.

In a particular embodiment, the listening system comprises an A/V device, e.g. a TV-set, or a wireless microphone. In a particular embodiment, the listening system comprises at least one listening device, e.g. at least one hearing instrument, e.g. two hearing instruments of a binaural hearing aid system. In a particular embodiment, the listening system comprises an intermediate communications device, e.g. an audio selection device.

In a particular embodiment, the transmitter form part of an A/V device, e.g. a TV-set, or a wireless microphone. In a particular embodiment, the receiver form part of an intermediate communications device, e.g. an audio selection device. In a particular embodiment, the receiver form part of a listening device. In a particular embodiment, the system comprises at least two listening devices each comprising a receiver for receiving the wirelessly transmitted signal from the same transmitter.

In a particular embodiment, the listening system comprises a communications device, e.g. an audio selection device and one or more listening devices, e.g. one or more battery driven listening devices, e.g. a hearing instrument, e.g. a pair of hearing instruments wherein the transmitter form part of the communications device and wherein at least one of the listening devices comprises a receiver.

In a particular embodiment, the wireless transmission link is based on radiated electromagnetic fields.

In a particular embodiment, the wireless transmission link is based on inductive communication (near-field). In an embodiment, the transmitter and receiver(s) each comprises an inductive coil, and where the transmitter and receiver(s) are adapted to allow an inductive coupling between the coils sufficient for allowing a transmission of the audio data from the transmitter to the receiver(s) when they are within a certain maximum distance of each other. In an embodiment, the transmitter and receiver(s) are adapted to allow a reception of a transmitted signal with a reasonable signal quality, when the maximum distance is smaller than or equal to 5 m, such as 3 m, such as 2 m, such as smaller than or equal to 1.5 m.

In an embodiment, the listening system comprises a wireless microphone or an A/V device, e.g. a TV-set, comprising a transmitter and an intermediate communications device (e.g. an audio selection device or a mobile telephone or a combination thereof) comprising a receiver, and wherein the transmitter and receiver are adapted to provide that the wireless transmission link is based on radiated electromagnetic fields. In an embodiment, the listening system further comprises at least one listening device, e.g. a hearing instrument or a pair of hearing instruments of a binaural fitting, and wherein the intermediate communications device and the at least one listening device comprises an inductive transmitter and receiver, respectively, adapted to establish an at least one-way wireless inductive link between them, and wherein the audio signal received by the intermediate communications device is transmitted to the at least one listening device via the one-way wireless inductive link.

In a preferred embodiment, the system is adapted to provide that the characteristics of the transmission from the device comprising the transmitter (e.g. an A/V device, e.g. a TV-set) to the intermediate communications device (e.g. an audio selection device or a mobile telephone or a combination thereof) comprising the receiver are adapted to the characteristics of the link between the intermediate communications device and the one or more listening devices with a view to minimizing delay from the transmitter to the listening device (s). In an embodiment, the listening system is adapted to provide that the characteristics of the transmission from the device comprising the transmitter comprise one or more of type of coding, sample rate, and link bandwidth. In an embodiment, the system is adapted to provide that the two wireless links use the same sample rate and the same coding scheme.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

FIG. 1 shows a first embodiments of the invention based on the transmission of coded audio samples (here G.722) through a synchronous data link (here a Bluetooth, SCO-based link).

In an embodiment, the invention is implemented on a source device based on a CSR (Cambridge Silicon Radio) Bluetooth IC, and a sink device based on a CSR Bluetooth solution and an ARM processor (ARM=Advanced RISC Machine).

Figure 1A:
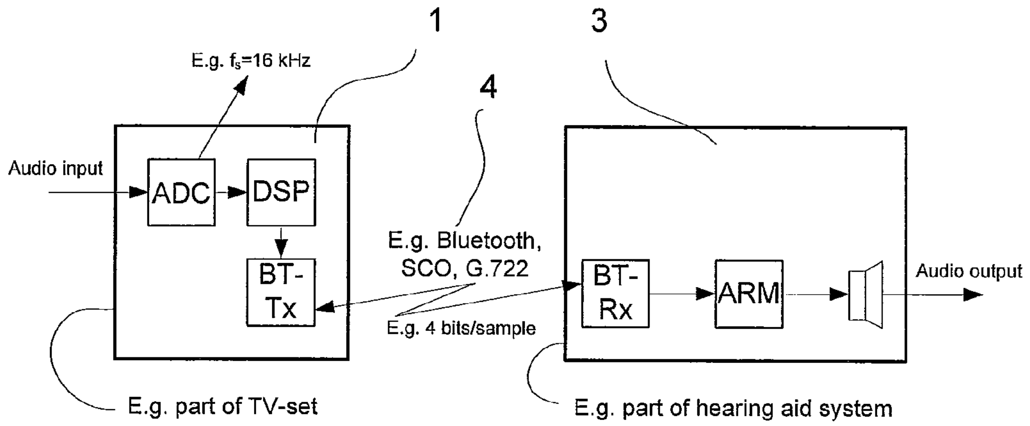
FIG. 1 shows a first embodiments of the invention.

On the source device 1 (e.g. a TV-set or a set-top box connected to the TV-set) comprising the transmitter, the incoming audio signal (e.g. a microphone input signal or another analogue electric signal representing an audio signal) is sampled (here at 16 kHz sampling rate) using the CSRs built-in A/D converter (ADC in FIG. 1*a*). The now digital audio signal is then compressed using the G.722 codec running on the CSRs DSP processor, the Kalimba (DSP in FIG. 1*a*). The audio data are transmitted at full quality (here meaning 4 bits/sample). This means that 64 kbit/s is required for the stream of audio samples. Alternatively, the audio input signal may already be on digital form and can be fed directly to the signal processor (DSP), possibly re-sampled, without specific (additional) analogue to digital conversion (ADC).

The audio stream is transmitted using a transparent data link 4 over a Bluetooth, SCO (synchronous connection) (BT-Tx in FIG. 1*a*), which supports up to 64 kbit/s. Each data packet is 30 bytes long, which corresponds to 60 audio samples, or 3.75 ms worth of audio. The link 4 is shown to be bi-directional. Typically the bandwidth necessary for the link direction from the source 1 of the audio signal (e.g. a TV) to receiver 3 (e.g. a hearing instrument) is dominant over the bandwidth of the back link from the receiver 3 to the source 1. In practice the transmitter and receiver blocks BT-Tx and BT-Rx symbolize transceivers, the back-link possibly only carrying control signals.

On the receiving side (e.g. an intermediate communications device or a hearing instrument comprising a Bluetooth SCO-receiver, BT-RX in FIG. 1*a*), the incoming stream of G.722 coded audio is transferred from the CSR Bluetooth receiver to a processing unit (here an ARM processor, ARM in FIG. 1*a*), where the audio is decoded, and then passed on to the remaining system, here to a receiver for providing an acoustic audio output to a wearer of a hearing instrument comprising the receiver. A corresponding embodiment of the invention is shown in FIG. 2*b*. Alternatively, the receiver may form part of an intermediate communications device as shown in FIG. 2*a*, and the decoded signal is coded and re-sampled according to the characteristics of the transmission link (5 in FIG. 2*a*) between the intermediate communications device and the hearing instrument(s). Such exemplary embodiments are further illustrated in FIG. 1*b* and 1*c*.

Bluetooth receiver and transmitter ICs are e.g. available from Texas Instruments, ST Microelectronics (Geneva. Switzerland) and Broadcom Corp. (Irvine, Calif., USA). A low-power 2.4-GHz transmitter/receiver CMOS IC is e.g. described by A. Zolfaghari and B. Razavi in IEEE Journal of Solid-State Circuits, Volume 38, Issue 2, February 2003 Page (s) 176-183. Bluetooth specifications can be found in the Bluetooth core spec available from Bluetooth.org. The G.722 standard is described in http://www.itu.int/rec/T-REC-G.722/e.

'Low latency' is in the present context taken to imply a delay that is not significantly hampering the application, e.g. a sufficiently low delay for a transmitted sound of a corresponding picture to be still perceived by a person as being in synchrony. In an embodiment, the delay of the audio signal received by the receiver compared to the original audio signal (e.g. as fed to the transmitter) is smaller than 30 ms, such as smaller than 20 ms, such as smaller than 15 ms, such as smaller than 10 ms.

Figure 1B:
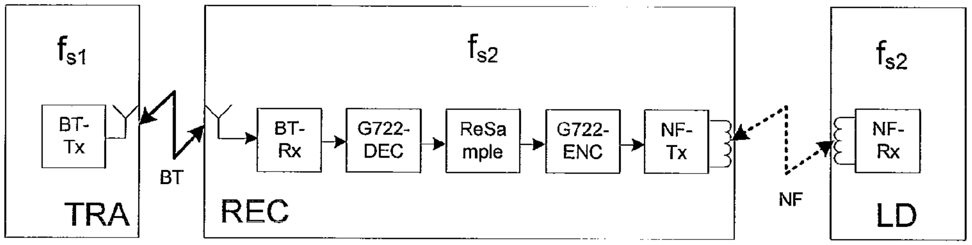
Figure 1C:
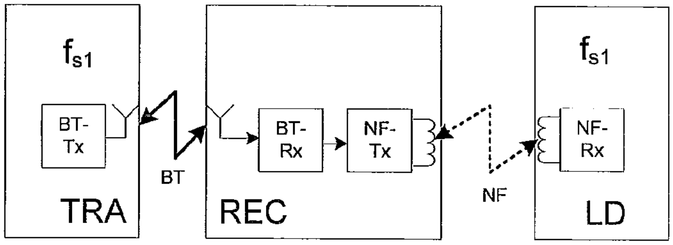
Figure 2A:
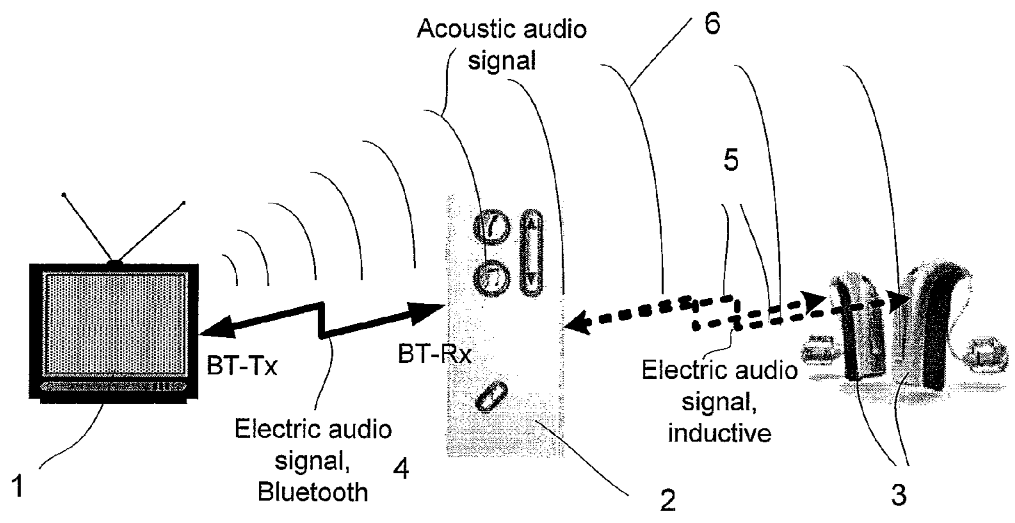
FIG. 2 shows further embodiments of the invention.
Figure 2B:
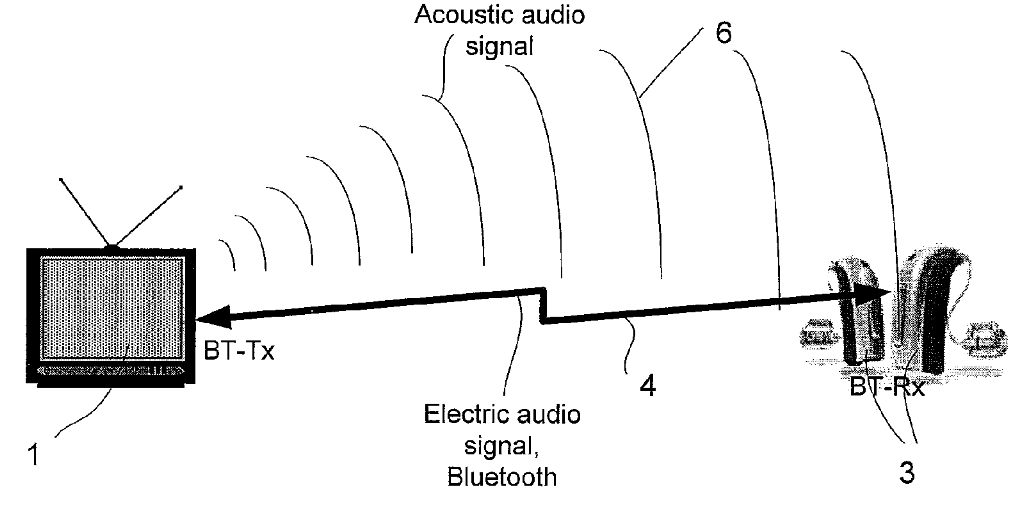

FIGS. 1*b* and 1*c* show embodiments of a listening system comprising a transmitter (TRA), a receiver embodied in an intermediate device (REC) and a listening device (LD). FIG. 1*b* and FIG. 1*c* focus on the signal path of the intermediate device between a transmitter (TRA) and the listening device (LD) in a system as depicted in FIG. 2*a*. FIGS. 1*b* and 1*c* both illustrate a situation where the same encoding/decoding scheme is used in both wireless links (BT, NF corresponding to 4, 5, in FIG. 2*a*), but in FIG. 1*b* different sampling rates ($f_{s1}$, $f_{s2}$) have been used in the transmitted signal of the link (BT, $f_{s1}$) between the transmitting device (TRA) and the intermediate device (REC) and in the transmitted signal of the link (NF, $f_{s2}$) between the intermediate device and the listening device (LD). In both embodiments of a listening system of FIGS. 1*b* and 1*c*, the transmitter (TRA) comprises a Bluetooth transmitter BT-Tx and an antenna for wirelessly transmitting (based on radiated fields) an audio signal sampled with a first sampling frequency $f_{s1}$ to an intermediate device REC comprising a corresponding Bluetooth receiver. In both embodiments of FIGS. 1*b* and 1*c*, the listening device (LD) comprises a near-field receiver for receiving a signal transmitted from a corresponding transmitter of the intermediate device (REC). The near-field receiver, here shown as an inductive receiver, comprises a receiving coil and corresponding receiver circuitry (NF-Rx), e.g. comprising amplification and demodulation circuitry adapted for receiving a signal sampled with a first ($f_{s1}$, FIG. 1*b*) or a second ($f_{s2}$, FIG. 1*c*) sampling frequency.

In the embodiment of FIG. 1*b* the intermediate device comprises a Bluetooth receiver (BT-Rx) for receiving a signal comprising an audio signal sampled with a first sampling rate fs1, electrically connected to a G.722-decoder (G722-DEC), electrically connected to a re-sampling unit (ReSample) for adapting the sampling rate fs1 (e.g. 32 kHz) of the Bluetooth based link (BT) to the sampling rate fs2 (e.g. 20 kHz) of the near-field based link (NF), electrically connected to a G.722 encoder (G722-ENC), which is finally electrically connected to a near-field transmitter comprising transmission circuitry (NF-Tx) and (here) inductive antenna coil for inductively transmitting a signal comprising the audio signal sampled with a second sampling rate fs2 to the listening device.

In the embodiment of FIG. 1*c* the intermediate device comprises a Bluetooth receiver (BT-Rx) for receiving a signal comprising an audio signal sampled with a first sampling rate $f_{s1}$, electrically connected to a near-field transmitter comprising transmission circuitry (NF-Tx) and (here) inductive antenna coil for inductively transmitting a signal comprising the audio signal sampled with a the same first sampling rate $f_{s1}$ to the listening device. In the latter embodiment, no re-sampling or decoding/encoding is necessary, because the same sampling rate is used in the first (BT) and second (NF) wireless link.

FIG. 2 shows further embodiments of the invention.

FIG. 2*a* shows an embodiment of the invention comprising a TV-set 1, an intermediate communications device 2 and a pair of hearing instruments 3. The wireless transmission link 4 (Electric audio signal, Bluetooth in FIG. 2*a*) between the TV-set comprising the transmitter (BT-Tx in FIG. 2*a*) for transmitting (e.g. G.722) coded samples and the intermediate communications device comprising a receiver (BT-Rx in FIG. 2*a*) adapted to receive the coded samples from the transmitter is a synchronous wireless (bi-directional) transmission link, e.g. Bluetooth, SCO, cf. solid arrow 4 in FIG. 2*a*. The communication between the intermediate communications device and the hearing instruments is provided by a bi-directional wireless inductive link 5 (Electric audio signal, inductive in FIG. 2*a*), cf. dashed arrows in FIG. 2*a*, the communications device and the hearing instrument(s) comprising inductive transmitter(s) and receiver(s), respectively. In an embodiment, the inductively transmitted signal is coded according to the G.722 standard. Alternatively, the inductive link may be unidirectional, thereby saving power in the hearing instruments (and in the communications device). Alternatively, the communication between the communications device and the hearing instrument(s) may be based on wired connection(s) or wireless connections other than inductive (e.g. radiated electromagnetic fields, acoustic, ultrasonic or optic signals). In an embodiment the wireless link between the communications device and the hearing instrument(s) is a wireless link according to the present invention, e.g. based on Bluetooth, SCO. In an embodiment the link from the communications device and the hearing instrument(s) has the same characteristics as the link between the audio source and the communications device. The propagation of the acoustic signal from a loud speaker of the TV-set to the hearing aid(s) is indicated by the arcs 6 denoted Acoustic audio signal in FIG. 2*a*.

In a preferred embodiment, the characteristics of the transmission from the device comprising the transmitter (in FIG. 2*a* TV-set 1) to the intermediate communications device (in FIG. 2*a* audio selection device 2) comprising the receiver are adapted to the characteristics of the link 5 between the intermediate communications device 2 and the one or more listening devices 3 with a view to minimizing delay. This can e.g. be done by using the same coding scheme (e.g. G.722) and adapting the bandwidth of the synchronous wireless (bi-directional) transmission link 4 between the TV-set 1 and the intermediate device 2 to that of the (typically limiting) link 5 between the intermediate device 2 and the listening device(s), e.g. hearing instrument(s) (e.g. 20 kHz sampling rate). The link between the intermediate device and the one or more listening devices may e.g. be an inductive link or a link based on radiated fields, e.g. a link according to the present invention, e.g. a Bluetooth, SCO link or based on a non-standardized (e.g. proprietary) scheme.

In an embodiment, the communications device is adapted for communicating with other devices providing an audio input (wired or wirelessly, e.g. according to the BlueTooth standard), including with a mobile telephone. Examples of such devices are e.g. described in EP 1 460 769 A1 and WO 2006/117365 A1.

Various aspects of inductive communication are discussed e.g. in EP 1 107 472 A2 and US 2005/0110700 A1. WO 2005/055654 and WO 2005/053179 describe various aspects of a hearing aid comprising an induction coil for inductive communication with other units.

FIG. 2*b* shows an embodiment of the invention equivalent to that of FIG. 1 comprising a TV-set 1 and a pair of hearing instruments 3. The wireless transmission link 4 (Electric audio signal, Bluetooth in FIG. 2*b*) between the TV-set comprising the transmitter (BT-Tx in FIG. 2*b*) for transmitting (e.g. G.722) coded samples and the hearing instruments, at least one of which (e.g. both) comprising a receiver (BT-Rx in FIG. 2*b*) adapted to receive the coded samples from the transmitter is a synchronous wireless transmission link, e.g. Bluetooth, SCO, cf. solid arrow 4 in FIG. 2*b*. The propagation of the acoustic signal from a loud speaker of the TV-set 1 to the hearing aid(s) 3 is indicated by the arcs 6 denoted Acoustic audio signal in FIG. 2*b*.

In an embodiment, the method of transmitting an audio signal according to the present invention is used to transmit an audio output from a TV to a hearing aid system. A low latency is needed to 1. ensure that a simultaneous acoustic version of the same audio signal (e.g. from a loudspeaker of the TV) is NOT significantly different in time of arrival at the ear of a user of the hearing aid system (and e.g. picked up directly, e.g. through a vent in an in the ear part of a hearing instrument, or via a microphone of the hearing aid system (if not muted)); and
2. ensure that sound and picture are appropriately simultaneous for a human to perceive them as 'simultaneous'.

In an embodiment, the transmitter form part of a TV-set (or a set-top-box). In an embodiment, the receiver form part of a hearing aid system, e.g. an audio selection device for selecting an audio signal among a number of audio signals and transmitting the selected signal to a hearing instrument or to the two hearing instruments of a binaural hearing aid system (cf. FIG. 2*a*). In an embodiment, the receiver form part of a hearing instrument (cf. FIG. 2*b*).

In an embodiment, the transmitter forms a part of a TV-set (or a set-top-box). In an embodiment, the receiver forms a part of a hearing aid system, e.g. an audio selection device for selecting an audio signal among a number of audio signals and transmitting the selected signal to a hearing instrument or to the two hearing instruments of a binaural hearing aid system (cf. FIG. 2*a*). In an embodiment, the receiver form part of a hearing instrument (cf. FIG. 2*b*).

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example, although the above embodiments of the invention comprising listening devices are exemplified as hearing instruments, other listening devices such as headsets, ear phones, ear plugs, ear protection devices or combinations thereof may equally well form part of embodiments of a system according to the invention.

REFERENCES

US 2008/0013763 A1 (SIEMENS AUDIOLOGISCHE TECHNIK) 17 Jan. 2008

Zolfaghari and B. Razavi, A low-power 2.4-GHz transmitter/receiver CMOS IC, IEEE Journal of Solid-State Circuits, Volume 38, Issue 2, February 2003, Page(s) 176-183.

EP 1 460 769 A1 (PHONAK) 22 Sep. 2004
WO 2006/117365 A1 (OTICON) 9 Nov. 2006
EP 1 107 472 A2 (SONY CORPORATION) 13 Jun. 2001
US 2005/0110700 A1 (STARKEY LABORATORIES) 26 May 2005
WO 2005/055654 (STARKEY LABORATORIES, OTICON) 16 Jun. 2005
WO 2005/053179 (STARKEY LABORATORIES, OTICON) 9 Jun. 2005
US 2007/0086601 A1 (D. W. Mitchler) 19 Apr. 2007
US 2007/291723 A1 (V. Chou et al.) 20 Dec. 2007

The invention claimed is:

1. A method of transmitting audio data in a listening system between an audio transmitter and an audio receiver, the listening system including a transmitting device including the audio transmitter, a receiving device including the audio receiver, and an intermediate communications device, wherein the listening system is configured to establish a first synchronous wireless link between the transmitting device and the intermediate communications device, and a second synchronous wireless link between the intermediate communications device and the receiving device, the method comprising:
- sampling an incoming audio signal in the audio transmitter to provide a stream of digitized audio samples;
- coding the stream of digitized audio samples according to an audio codec based on a sample oriented audio compression algorithm to provide a stream of coded digitized audio samples in the audio transmitter;
- transmitting from the audio transmitter the stream of coded digitized audio samples over the first synchronous wireless link;
- receiving over the second synchronous wireless link the stream of coded digitized audio samples at the receiver;
- decoding the stream of coded digitized audio samples according to said audio codec to a stream of digitized audio samples, wherein
- a coding and decoding scheme, and sampling rate used in the first synchronous wireless link between the transmitting device and the intermediate communications device are the same as in the second synchronous wireless link between the intermediate communications device and the receiving device.

2. A method according to claim 1 wherein the audio codec is the G.722 codec.

3. A method according to claim 1, wherein the first synchronous wireless link is a low latency link.

4. A method according to claim 3 wherein the low latency link is a transparent link.

5. A method according to claim 1, wherein the first synchronous wireless link comprises a SCO connection of the Bluetooth standard.

6. A method according to claim 1, wherein the sampling rate is larger than 8 kHz.

7. A method according to claim 1, wherein each audio sample comprises more than 2 bits.

8. A method according to claim 1, wherein the transmission rate of the first synchronous wireless link is in the range from 32 kbit/s to 128 kbit/s.

9. A method according to claim 1, wherein the receiving device forms a part of a listening system, e.g. comprising an audio selection device and/or one or more listening devices, e.g. one or more battery driven listening devices.

10. A method according to claim 9, wherein the same decoded digitized audio signal is used in more than one of said one or more listening devices.

11. A method according to claim 1, wherein the audio transmitter forms a part of a TV-set or a wireless microphone.

12. A listening system configured to establish a first synchronous wireless link between a transmitting device and an intermediate communications device, and a second synchronous wireless link between the intermediate communications device and a receiving device, the listening system comprising:
- the transmitting device, including
  - a wireless audio transmitter,
  - a sampling unit configured to convert an incoming audio signal to a stream of digitized audio samples,
  - an encoder unit configured to code the stream of digitized audio samples according to an audio codec based on a sample oriented audio compression algorithm to provide a stream of coded digitized audio samples, and
  - a signal transmitting unit configured to transmit the stream of coded digitized audio samples over the first synchronous wireless link to the intermediate communications device;
- the intermediate communications device receiving the stream of coded digitized audio samples through the first synchronous wireless link and transmitting the stream of coded digitized audio samples to the receiving device through the second synchronous wireless link; and
- the receiving device, including
  - an audio receiver,
  - a signal receiving unit configured to receive the stream of coded digitized audio samples over the second synchronous wireless link, and
  - a decoder unit configured to decode the stream of coded digitized audio samples according to said audio codec to a stream of digitized audio samples, wherein
- a coding and decoding scheme, and sampling rate used in the first synchronous wireless link between the transmitting device and the intermediate communications device are the same as in the second synchronous wireless link between the intermediate communications device and the receiving device.

13. A listening system according to claim 12, wherein the transmitting device is an A/V-device.

14. A listening system according to claim 12, wherein the receiving device is at least one hearing instrument.

15. A listening system according to claim 14, adapted to provide that characteristics of the transmission from the device comprising the transmitter to the intermediate communications device are adapted to corresponding characteristics of the link between the intermediate communications device and the one or more listening devices with a view to minimizing delay.

16. A listening system according to claim 15 adapted to provide that the characteristics of the transmission from the device comprising the transmitter comprise one or more of type of coding, sample rate, and link bandwidth.

17. A listening system according to claim 14, adapted to provide that the wireless link between the communications device and the one or more listening devices based on Bluetooth, SCO.

18. A listening system according to claim 14, adapted to provide that the wireless link between the communications device and the one or more listening devices is based on radiated fields using a standard or a proprietary communications protocol.

19. A listening system according to claim 14, adapted to provide that the wireless link between the communications device and the one or more listening devices is based on an inductive communications link.

20. A listening system according to claim 12, comprising
an A/V-device,
a communications device, and
one or more listening devices, wherein
the transmitter forms part of the A/V-device,
the receiver forms part of the one or more listening devices, and
the communications device and the one or more listening devices are configured to provide that the audio signal can be transmitted from the communications device to the one or more listening devices via an inductive communications link.

* * * * *